United States Patent [19]

Prikkel, III et al.

[11] Patent Number: 4,587,706

[45] Date of Patent: May 13, 1986

[54] THERMALLY RESPONSIVE DAMPER ASSEMBLY HAVING INTERFITTING PARTS AND METHOD

[75] Inventors: John Prikkel, III, Dayton; Dale R. Booher, Fairborn, both of Ohio

[73] Assignee: Energy Vent, Inc., Dayton, Ohio

[21] Appl. No.: 706,148

[22] Filed: Feb. 27, 1985

Related U.S. Application Data

[62] Division of Ser. No. 134,308, Mar. 26, 1980, abandoned.

[51] Int. Cl.[4] .................. B21D 39/00; G05D 23/00
[52] U.S. Cl. .................... 29/513; 236/93 R; 236/1 G
[58] Field of Search ............ 29/513, 505, 157 R, 29/157.1 R, 173; 236/49, 1 G, 93 R, 96; 431/20

[56] References Cited

U.S. PATENT DOCUMENTS

| | | | |
|---|---|---|---|
| 1,784,608 | 12/1930 | Meyers | 236/93 R |
| 2,102,873 | 12/1937 | Anderson | 236/16 |
| 2,117,529 | 5/1938 | Wile et al. | 236/49 |
| 2,959,933 | 11/1960 | Burke | 236/93 R |
| 2,975,975 | 3/1961 | Weber | 236/49 |
| 3,366,333 | 1/1968 | Diehl | 236/93 |
| 4,165,833 | 8/1979 | Nagel | 431/20 |
| 4,190,140 | 2/1980 | Konkle et al. | 29/157.1 R |
| 4,236,668 | 12/1980 | Prikkel, III | 236/1 G |

FOREIGN PATENT DOCUMENTS 458924 8/1949 Canada ..................... 236/96

*Primary Examiner*—Harry Tanner
*Attorney, Agent, or Firm*—Dybvig & Dybvig

[57] ABSTRACT

A thermally responsive damper assembly for mounting into a duct which is to be regulated by the damper assembly comprises a damper plate having oppositely disposed notch portions and arm portions one piece with said damper plate projecting outwardly in said notch portions and thermally responsive convoluted coil elements having convolutions surrounding said arm portions, bracket means affixed to the outermost convolution of each of said coil elements for attachment to said duct, and each of said coil elements having innermost convolutions keyed for attachment in only one orientation to an arm projecting outwardly in a notch portion of said damper plate.

2 Claims, 4 Drawing Figures

U.S. Patent   May 13, 1986   4,587,706
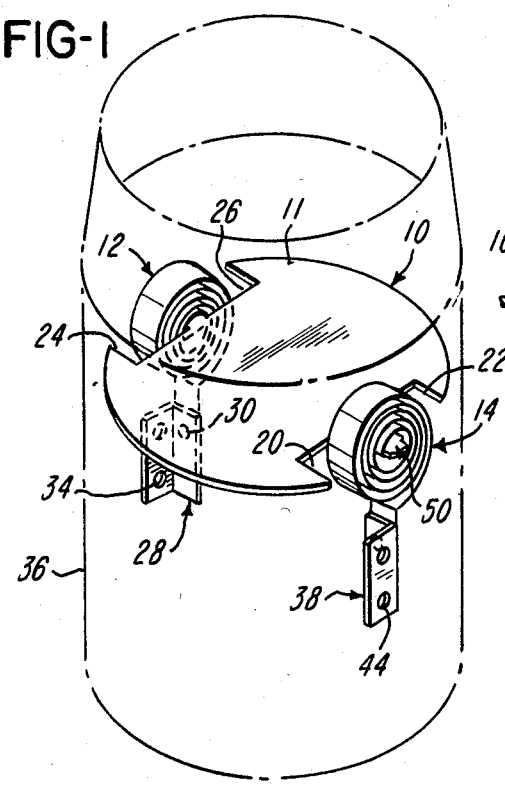
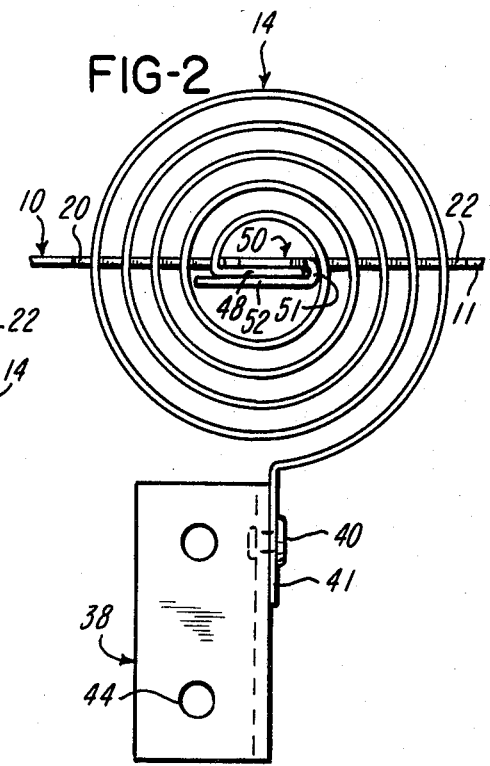
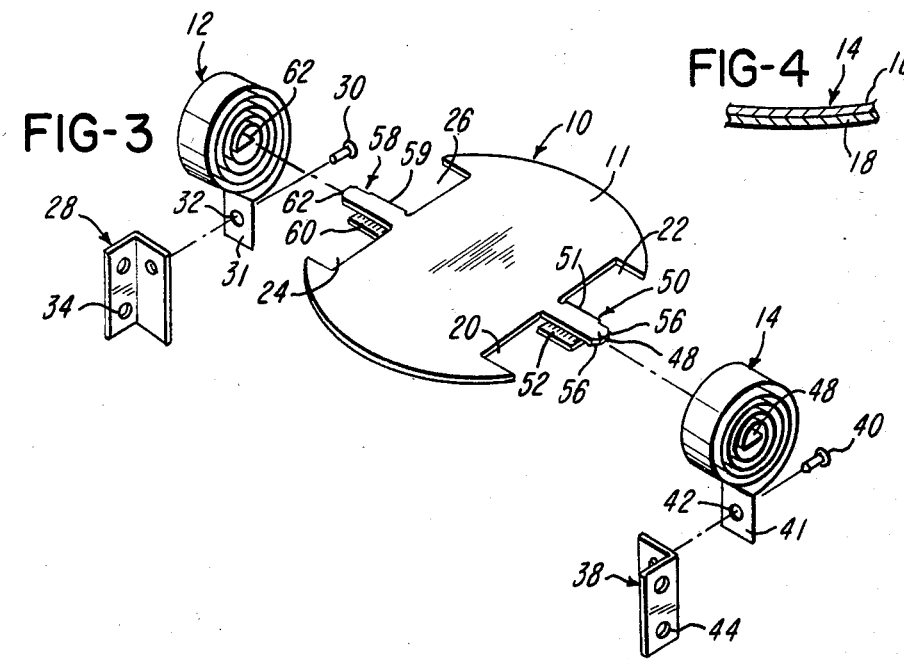
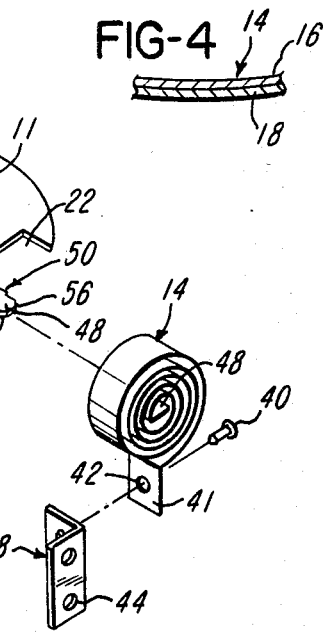

THERMALLY RESPONSIVE DAMPER ASSEMBLY HAVING INTERFITTING PARTS AND METHOD

This application is a division, of application Ser. No. 134,308, filed Mar. 26, 1980 now abandoned.

BRIEF SUMMARY OF THE INVENTION

A damper member for inclusion in the damper assembly of the present invention comprises a sheet metal member that has been stamped and folded to provide a generally circular damper plate having diametrically disposed notches within which remain, as one piece with the damper plate, diametrically disposed arm portions formed by folding over sheet metal portions not completely severed from the damper plate as the aforementioned notches were formed. These folded over arms are sized to slidably receive and interfit tongue elements located at the innermost convolutions of spirally formed coils of bimetallic composition. The construction of the damper arms and of the bimetallic coils is such that the tongues of the coils slide smoothly between the folded sides of the arms in only one orientation of the coil with respect to the damper plate, the consequence being that the torques developed by the bimetallic coils in response to thermal excitation favor one another.

Brackets attached to the outermost convolutions of the bimetallic coils are attachable to the inside surface of a flue duct and in the deferred operating mode for the present invention, such brackets are affixed to the flue duct at such positions that the thermally responsive bimetallic coils position the damper plate at room temperatures to close the duct and, at elevated temperatures, to open the duct.

BRIEF DESCRIPTION OF THE DRAWINGS

In the drawings:

FIG. 1 is a perspective view illustrating with solid lines the damper assembly of the present invention assembled in a duct illustrated by broken lines.

FIG. 2 is a fragmentary side elevation view of the damper assembly.

FIG. 3 is an exploded perspective view of the damper assembly.

FIG. 4 is an enlarged fragmentary section view schematically illustrating a portion of bimetallic composition broken away from one of the thermally responsive coils of the illustrated damper assembly.

DETAILED DESCRIPTION

Referring to the drawings in greater detail, FIG. 1 illustrates a damper assembly 10 in accordance with the present invention schematically positioned within a duct 36 which is illustrated in broken line detail.

The damper assembly 10 comprises a damper plate 11 having a generally circular periphery except where notched, as will be described, at diametrically opposite peripheral portions. Supported within the notched portions in the periphery of the damper plate 11, by means to be described, are thermally responsive coils 12 and 14. In the preferred form of the present invention, the coils 12 and 14 are bimetallic coils. Thus FIG. 4 illustrates a greatly enlarged fragment broken out of the coil 14 so as to reveal that the coil 14 comprises lamina 16 and 18 bonded face to face by any suitable metallurgical bonding technique. As well understood, the lamina 16 and 18 have differing thermal expansion characteristics and for purposes of describing the present invention one can assume the lamina 18 to expand a greater distance with an increase in temperature than does the lamina 16 with the same increase in temperature. Thus with increasing temperature, the more rapid expansion of the lamina 18 causes the lamina 16 to become curled within the lamina 18.

In the preferred construction, the coils 12 and 14 are similarly wound with the outermost lamina of each convolution thereof being the lamina 18 and the innermost lamina of each convolution comprising the lamina 16.

The lamina 16 may typically be an alloy of nickel and iron and the lamina 18 may typically comprise a different alloy of iron. Since the coils 12 and 14 are similarly wound, the outermost convolution of each coil will tend to advance in the clockwise direction, as the coils appear in FIG. 1, with increasing temperatures such that the outermost convolution tends to more completely surround the innermost convolution of the same coil.

As best seen in FIG. 3, the damper plate 11 comprises a metal sheet which is stamped so as to have a generally circular periphery interrupted by notches 24 and 26 on the left side thereof and notches 20 and 22 on the right side thereof, said notches defined by the removal or knocking out of sheet metal from the original blank stamped to form the damper plate 11. Separating the notches 20 and 22 to the right side of the damper plate is an arm 50 extending radially outwardly between the notches 20 and 22 and having its corners 56 clipped to remove sharp angles from radially outermost end of the arm 50. When the damper plate 11 is initially stamped, the arm 50 is much wider than it appears in FIG. 3 so that the arm 50 can be folded approximately in half to form a flange 52 lying under the arm 50 and joined to the arm 50 by means of a radially extending crease or pleat 51 located at the right edge of the arm 50.

The notches 24 and 26 disposed to the left side of the damper plate 11 as appears in FIG. 3 are likewise separated by an arm 58 folded so as to have an underlying flange 60 adjoined to the right side of the arm 58 by means of a radially extending pleat or crease 59.

As evident in FIG. 3, each of the coils 12 and 14 has its innermost convolution bent sharply to form a tongue which extends approximately diametrically across the innermost convolution, the coil 12 thus having a tongue 62 and the coil 14 having a tongue 48. The location of the tongue 62 allows the arm 58 to slide into the innermost convolution of the coil 12 in overlying relation to the tongue 62 while the tongue 62 slides into the space between the arm 58 and the flange 60 such that the free edge of the tongue 62 confronts the pleat 59.

It will be noted that the manner in which the coil 12 with its tongue 62 keys to the arm 58 with its flange 60 precludes assembly of the coil 12 in a reversed position with respect to the arm 58. Thus the only manner in which the coil 12 can be assembled to the arm 58 without forcefully misfitting the parts is in a position wherein the outermost convolution of the coil 12 will move in the clockwise direction about the arm 58 with increasing temperatures. Likewise, the only manner in which the coil 14 can be assembled to the arm 50, except by forced misfit, is in a position in which the outermost convolution of the coil 14 will proceed clockwise about the arm 50 with increasing temperatures.

It will be noted, however, that the coils 12 and 14 are both convoluted in the same sense with the consequence that the coils 12 and 14 are interchangeable without effect on the direction in which the outermost convolution of each coil moves with increasing temperature. Thus the coil 14 can be assembled to the arm 58 and the coil 12 assembled to the arm 50 without change in the thermal response of the assembled unit.

In a preferred mode of assembly, the outermost convolution of each of the coils 12 and 14 is bent near the free end thereof so as to extend radially outwardly from the center of the coil. More particularly, the outermost convolution of the coil 12 has been flattened and bent so as to form a wing 31 which projects radially outwardly from the coil 12 and, at room temperatures, occupies a plane which is perpendicular to the plane occupied by the tongue 62. The wing 31 has a perforation 32 through which passes a rivet 30 which is used to secure a bracket 28 to the wing 31. The bracket 28 is a conventional right angle bracket having perforations 34, one of which receives the rivet 30.

The coil 14 is similarly formed with a wing 41 having a perforation 42 for receiving a rivet 40 which fixes a wing 41.

The coils 12 and 14 can each be said to have a clockwise face and a counterclockwise face. Referring to FIG. 2, for example, this Figure illustrates the clockwise face of the coil 14, this face being called a clockwise face because a thermal expansion of the lamina comprising the coil 14 would appear to result in a clockwise movement of the wing 41 relative to the tongue 48. FIGS. 1 and 3 similarly illustrate the clockwise faces of the coils 12 and 14. The opposite faces of these coils can be referred to as the counterclockwise faces because with increasing temperatures one observing such opposite face would observe a counterclockwise progression of the wing relative to the tongue.

Referring to FIGS. 1 and 3, one can note that the flange of the bracket 28 which stands upwardly from the wing 31 is generally coplanar with the counterclockwise face of the coil 12. Conversely, the flange of the bracket 38 which stands upwardly from the wing 41 of the coil 14 is generally coplanar with the clockwise face of the coil 14. In this sense the brackets 28 and 38 are assembled oppositely to the coils 12 and 14.

Reference to FIG. 1 will reveal that the opposite assemblies of the brackets 28 and 38 has positioned the upstanding flanges of these brackets for convenient attachment, as by riveting, not shown, to the inside wall of the duct 36. It can be noted, of course, that the riveting of the brackets 28 and 38 to the coils 12 and 14 has rendered these coils no longer interchangeable in respect of the present invention. Thus, should the coils 12 and 14 be assembled to the damper plate 11 in a reversed fashion such that the coil 14 occupies the position of the coil 12 and vice versa, the brackets 28 and 38 will no longer be favorably positioned for riveting attachment to the duct 36.

The fact that the coils 12 and 14 are no longer interchangeable within the framework of the present invention, once attached to their respective brackets means that, for mass production, half of the initially interchangeable coils 12 and 14 must receive brackets mounted as the bracket 28 and the other half must receive brackets mounted as the bracket 38, whereupon properly trained assembly personnel will be led naturally to properly assemble the coils 12 and 14 to the damper plate 11. This consideration is obviously important since the reversed installation of either of the coils 12 and 14 will place the coils 12 and 14 in opposition in terms of their response to changing temperatures with the consequence that the damper plate 11 would not be caused to rotate in response to changing temperatures.

As evident in FIG. 1, and for the reasons discussed, the brackets 28 and 38 of the damper assembly 10 are favorably positioned for affixation to the inside wall surface of the duct 36, it being preferred that such affixation causes the brackets 28 and 38 acting in cooperation with the coils 12 and 14 to support the damper plate 11 in a plane which is transverse to the longitudinal axis for the duct 36 when the coils 12 and 14 are exposed to room temperature conditions.

Although the preferred embodiment of this invention has been described, it will be understood that various changes may be made within the scope of the appended claims.

Having thus described our invention, we claim:

1. The method of forming a damper assembly for fitting within a duct comprising the steps of stamping and bending a sheet metal plate for fitting within said duct, and for providing peripheral notches in said plate and folded arms integral with said plate and located in said notches, said folded arms each projecting coplanarly from said plate and each having an underlying flange joined to the arm by means of a crease located at one edge of the arm, spirally convoluting bimetallic coil elements, bending the innermost convolution of each of said coil elements to form a tongue traversing such innermost convolution, and sliding said tongues into said folded arms.

2. The method of claim 1 including the steps of bending the end of the outermost convolution of each of said coil elements to form an outwardly extending wing at the end of each of said coil elements, and affixing flanges of angle brackets to the wings of said coil elements with other flanges of said brackets disposed substantially coplanar to respective clockwise and counterclockwise faces of said coil elements.

* * * * *